United States Patent
Weh et al.

(10) Patent No.: US 12,325,390 B2
(45) Date of Patent: Jun. 10, 2025

(54) NON-RETURN VALVE FOR A HYDRAULIC VEHICLE POWER BRAKE SYSTEM, AND HYDRAULIC VEHICLE POWER BRAKE SYSTEM

(71) Applicant: Robert Bosch GmbH, Stuttgart (DE)

(72) Inventors: Andreas Weh, Sulzberg (DE); Martin Hagspiel, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 359 days.

(21) Appl. No.: 17/791,467

(22) PCT Filed: Nov. 5, 2020

(86) PCT No.: PCT/EP2020/081048
§ 371 (c)(1),
(2) Date: Jul. 7, 2022

(87) PCT Pub. No.: WO2021/144049
PCT Pub. Date: Jul. 22, 2021

(65) Prior Publication Data
US 2023/0030643 A1    Feb. 2, 2023

(30) Foreign Application Priority Data
Jan. 18, 2020  (DE) ..................... 10 2020 200 570.2

(51) Int. Cl.
*B60T 13/58*    (2006.01)
*B60T 8/94*    (2006.01)
(Continued)

(52) U.S. Cl.
CPC ................ *B60T 13/58* (2013.01); *B60T 8/94* (2013.01); *B60T 13/142* (2013.01);
(Continued)

(58) Field of Classification Search
CPC . B60T 13/58; B60T 15/00; B60T 8/94; B60T 13/142; B60T 13/148;
(Continued)

(56) References Cited

U.S. PATENT DOCUMENTS 8,991,941 B2 *   3/2015  Gotoh ................... B60T 17/221
                                                           303/116.1
2012/0228925 A1   9/2012  Baechle et al.
(Continued)

FOREIGN PATENT DOCUMENTS

CN    102556025 A    7/2012
CN    104709254 A    6/2015
(Continued)

OTHER PUBLICATIONS

German Patent No. DE 102018212850 to Mergenthaler et al published on Feb. 6, 2020.*
(Continued)

*Primary Examiner* — Pamela Rodriguez
(74) *Attorney, Agent, or Firm* — NORTON ROSE FULBRIGHT US LLP

(57) ABSTRACT

A non-return valve having a valve opening spring is positioned between an unpressurized brake fluid reservoir and a brake master cylinder of a hydraulic vehicle power brake system having an externally-powered brake pressure generator. The non-return valve allows for a flow-through in the direction of the brake master cylinder and blocking against a return flow from the brake master cylinder into the brake fluid reservoir starting at a counterpressure in the brake master cylinder specified by the valve opening spring.

13 Claims, 3 Drawing Sheets

(51) Int. Cl.
  *B60T 13/14* (2006.01)
  *B60T 13/16* (2006.01)
  *B60T 15/00* (2006.01)
  *B60T 17/00* (2006.01)
(52) U.S. Cl.
  CPC .......... *B60T 13/148* (2013.01); *B60T 13/161* (2013.01); *B60T 15/00* (2013.01); *B60T 17/00* (2013.01); *B60T 2270/402* (2013.01)
(58) Field of Classification Search
  CPC ........ B60T 13/161; B60T 17/00; B60T 8/341; B60T 2270/402
  See application file for complete search history.

(56) References Cited

U.S. PATENT DOCUMENTS

| | | | |
|---|---|---|---|
| 2015/0035353 A1* | 2/2015 | Drumm | B60T 11/28 303/15 |
| 2016/0152219 A1 | 6/2016 | Besier et al. | |
| 2018/0290641 A1 | 10/2018 | Brok et al. | |
| 2019/0016321 A1 | 1/2019 | Dinkel | |
| 2022/0055585 A1* | 2/2022 | Franke | B60T 11/232 |

FOREIGN PATENT DOCUMENTS

| | | |
|---|---|---|
| CN | 107428325 A | 12/2017 |
| CN | 107848512 A | 3/2018 |
| DE | 102012222897 A1 | 8/2013 |
| DE | 102016210949 A1 | 12/2017 |
| JP | 4325426 B | 11/1968 |
| JP | S5666174 A1 | 6/1981 |
| JP | S57179562 U | 11/1982 |
| JP | H1067312 A | 3/1998 |
| JP | 2008081100 A | 4/2008 |
| JP | 2014019243 A | 2/2014 |
| JP | 2018526280 A | 9/2018 |
| JP | 2019505438 A | 2/2019 |
| WO | 2012150120 A1 | 11/2012 |
| WO | 2015022264 A1 | 2/2015 |

OTHER PUBLICATIONS

International Search Report for PCT/EP2020/081048, Issued Jan. 14, 2021.

* cited by examiner

NON-RETURN VALVE FOR A HYDRAULIC VEHICLE POWER BRAKE SYSTEM, AND HYDRAULIC VEHICLE POWER BRAKE SYSTEM

FIELD

The present invention relates to a special non-return valve for a hydraulic vehicle power brake system, and a hydraulic vehicle power brake system which includes such a non-return valve.

BACKGROUND INFORMATION

Springless and spring-loaded non-return valves are described in the related art, the spring-loaded non-return valves opening only when an opening pressure specified by a valve closing spring is exceeded.

PCT Patent Application No. WO 2012/150 120 A1 describes a hydraulic vehicle power brake system provided with a brake master cylinder which is operable by muscular energy, power brake-pressure generator, and a brake fluid reservoir to which a brake circuit of the brake master cylinder is connected by a solenoid valve which is open in its currentless basic position. Hydraulically connected in parallel to the solenoid valve is a non-return valve which allows for a flow in the direction of the brake master cylinder.

SUMMARY

Similar to springless non-return valves, a non-return valve according to the present invention allows a flow to pass through in a flow direction. Instead of a valve-closing spring, the non-return valve according to an example embodiment of the present invention has a valve-opening spring which keeps the non-return valve open until a specified counterpressure in a closing direction counter to the flow-through direction is reached, so that a flow is able to pass through the non-return valve both in the flow direction and in the opposite closing direction as long as the specified counterpressure is not exceeded. The counterpressure is a pressure that prevails between a valve outlet and a valve inlet or, generally, a pressure that prevails between two connections of the non-return valve and acts in the closing direction of the non-return valve, which closes the non-return valve according to the present invention counter to an opening force of the valve opening spring once it exceeds a specified value. The non-return valve according to the present invention thus closes against a flow in the closing direction only when the specified counterpressure is exceeded. The specified counterpressure may be fixed or adjustable and in particular is specified by the valve opening spring but also by a geometry and design of the non-return valve.

A hydraulic vehicle power brake system according to an example embodiment of the present invention has a brake master cylinder which is operable by muscular energy, power brake-pressure generator, and an in particular unpressurized brake fluid reservoir. The brake master cylinder can also be operated by an auxiliary power, or in other words, by muscular energy amplified by an auxiliary power of a brake-pressure booster. A non-return valve of the aforementioned type connects a brake circuit of the brake master cylinder to the brake fluid reservoir. The non-return valve allows for a flow-through in the direction of the brake master cylinder. The non-return valve also allows for a flow-through in the opposite closing direction until the specified counterpressure is reached. The non-return valve closes against the flow from the direction of the brake master cylinder in the direction of the brake fluid reservoir only when the specified counterpressure is exceeded, that is, when the pressure on the brake master cylinder side of the non-return valve is greater by more than the specified counterpressure than on the side of the brake fluid reservoir. If the brake master cylinder has more than one brake circuit, additional brake circuits may not be connected to the brake fluid reservoir, for example, directly without a valve, by a solenoid valve, by a non-return valve having a development that differs from the present invention, or some other valve not developed according to the present invention.

An alternative embodiment of the present invention provides a switchable test valve which is hydraulically connected in parallel to the non-return valve. The non-return valve is preferably a standard non-return valve with or without a valve closing spring. The test valve opens at a specified overpressure in the brake master cylinder relative to a pressure in the brake fluid reservoir so that brake fluid flows out of the brake master cylinder into the brake fluid reservoir also if the test valve is closed when the specified overpressure in the brake master cylinder is reached or exceeded. 'Switchable' means that the test valve can be switched over between a closed and an open position.

All features disclosed in the description and the figures may be realized in embodiments of the present invention, either individually or in basically any combination. Embodiments of the present invention that have not all but only one or more features of an embodiment of the present invention are possible in principle.

BRIEF DESCRIPTION OF THE DRAWINGS

In the following text, the present invention will be described in greater detail based on an embodiment illustrated in the figures.

DETAILED DESCRIPTION OF EXAMPLE EMBODIMENTS

Figure 1:
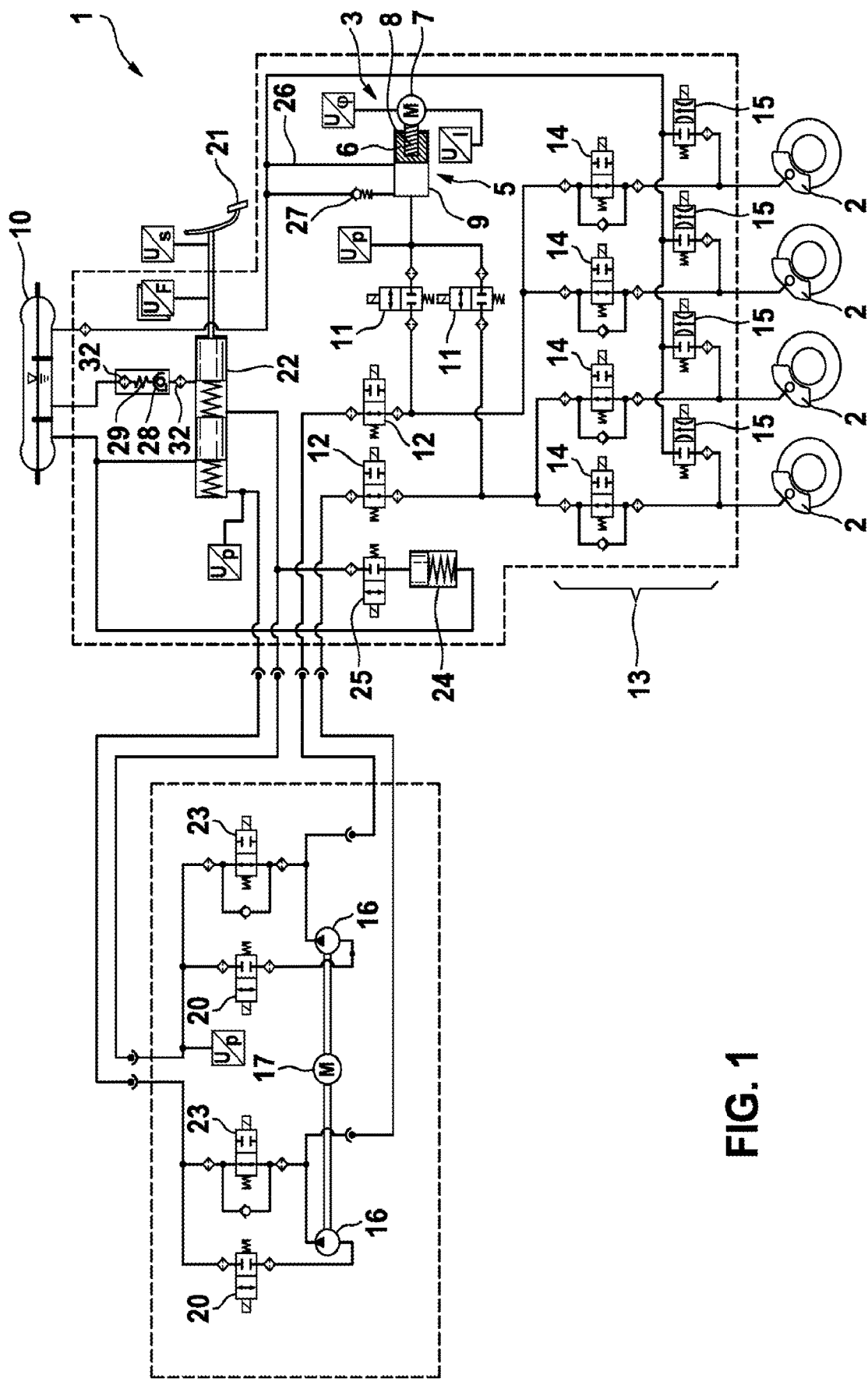
FIG. 1 shows a hydraulic circuit diagram of a hydraulic vehicle power brake system according to the present invention having a non-return valve according to an example embodiment of the present invention.

The hydraulic vehicle power brake system 1 according to the present invention is intended for a passenger car which has four hydraulic wheel brakes 2 and is developed as a dual-circuit brake system having two hydraulic wheel brakes 2 per brake circuit. Other embodiments are possible such as a single-circuit brake system or a multi-circuit brake circuit having more than two brake circuits and/or a different number of wheel brakes 2 and/or a different allocation of wheel brakes 2 to the brake circuits.

Vehicle brake system 1 has an electrohydraulic power brake pressure generator 3 which includes a piston-cylinder unit 5 whose piston 6 is axially displaceable in a cylinder 9 for the generation of a brake pressure with the aid of an electric motor 7 via a screw drive 8 or some other rotation-translation gearing. Piston-cylinder unit 5 may also be referred to as a plunger unit, its piston 6 as a plunger piston, and its cylinder 9 as a plunger cylinder.

Cylinder 9 of piston-cylinder unit 5 of power brake pressure generator 3 is directly connected to a brake fluid reservoir 10 by a brake line 26, and indirectly connected to unpressurized brake fluid reservoir 10 by a non-return valve 27 that allows for a flow in the direction of cylinder 9 so that brake fluid is able to be suctioned from brake fluid reservoir 10. Piston 6 of piston-cylinder unit 5 overruns brake line 26 at the start of its lift, which causes this connection to brake fluid reservoir 10 to be closed at the start of the lift of piston 6 of piston-cylinder unit 5. Via non-return valve 27, cylinder 9 is connected to brake fluid reservoir 10 at all times.

Wheel brakes 2 are connected to power brake pressure generator 3, or more specifically to cylinder 9 of piston-cylinder unit 5 of power brake pressure generator 3, by way of valves, denoted here as servo valves 11, first isolation valves 12, and a brake-pressure valve control system 13. For the subdivision into the two brake circuits, two servo valves 11 are hydraulically connected in parallel, two first isolation valves 12 are likewise hydraulically connected in parallel, and one of the two servo valves 11 and one of the two first isolation valves 12 are hydraulically connected in series in each brake circuit. Via brake-pressure control valve system 13, two wheel brakes 2 are connected by way of a servo valve 11 and a first isolation valve 12 to power brake pressure generator 3 in each case.

For each wheel brake 2, brake-pressure control valve system 13 has an inlet valve 14 and an outlet valve 15. Via inlet valves 14, wheel brakes 2 are connected to first isolation valves 12, that is, in each brake circuit two wheel brakes 2 are connected by an inlet valve 14 to a first isolation valve 12. Via outlet valves 15, wheel brakes 2 are connected to brake fluid reservoir 10.

Inlet valves 14 and outlet valves 15 form brake-pressure control valve system 13 by which the wheel brake pressures in each wheel brake 2 are individually controllable. Together with hydraulic pumps 16, slip controls, in particular an anti-lock control, drive slip control and/or driving dynamics control or electronic stability program are possible. The abbreviations ABS, ASR and/or FDR or ESP are commonly used for these slip controls. Driving dynamics controls and electronic stability programs are colloquially also referred to as wheel skid controls. Such slip controls are described in the related art and will not be described here in greater detail.

Vehicle brake system 1 according to the present invention has a dual-circuit brake master cylinder 22 as a muscular energy brake pressure generator, which can be operated by a foot brake pedal 21, to which wheel brakes 2 in each brake circuit are connected via a second isolation valve 23, first isolation valves 12 and inlet valves 14 of brake-pressure control valve system 13, so that vehicle brake system 1 can also be operated by muscular energy. Second isolation valves 23, first isolation valves 12 and inlet valves 16 are hydraulically disposed in series. Dual circuit brake master cylinder 22 may have a brake booster, which is not shown, and can then be referred to as an power brake pressure generator.

Via suction valves 20, the suction sides of hydraulic pumps 16 through which hydraulic pumps 16 are able to suction brake fluid from brake fluid reservoir 10 are connected to brake master cylinder 22. Each brake circuit is provided with a hydraulic pump 16, which is able to be driven by a shared electric motor 17. First isolation valves 12 and inlet valves 14 connect the pressure sides of hydraulic pumps 16 to wheel brakes 2. Hydraulic pumps 16, which are accommodated in a separate hydraulic block together with suction valves 20 and second isolation valves 23, are used for the brake pressure generation in the slip controls.

Fundamentally, an operation of vehicle brake system 1 by external power is provided, for which the electrohydraulic power brake pressure generator 3 generates a brake pressure. In a fault or failure of electrohydraulic power brake pressure generator 3, it is possible to generate brake pressure with the aid of hydraulic pumps 16 of the slip control or optionally with the aid of brake master cylinder 22. Brake master cylinder 22 is normally used as a setpoint device for the wheel brake pressures to be adjusted in wheel brakes 2 having a functioning electrohydraulic power brake pressure generator 3.

In one of the two brake circuits, a pedal travel simulator 24 is connected via a simulator valve 25 to brake master cylinder 22. Pedal travel simulator 24 is a spring-loaded hydraulic accumulator into which brake fluid is displaceable from brake master cylinder 22 when simulator valve 25 is open, so that in power braking operation in which second isolation valves 23 are closed, a piston in brake master cylinder 22 is displaceable and foot brake pedal 21 is movable in order to provide the vehicle driver with a familiar pedal feel.

Figure 2A:
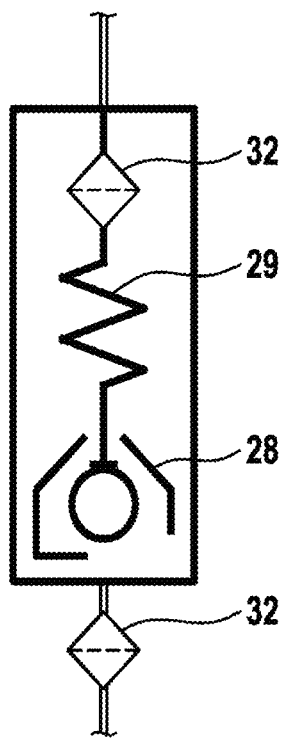
FIGS. 2A-2C show a circuit symbol of the non-return valve according to an example embodiment of the present invention in three switch positions.
Figure 2B:
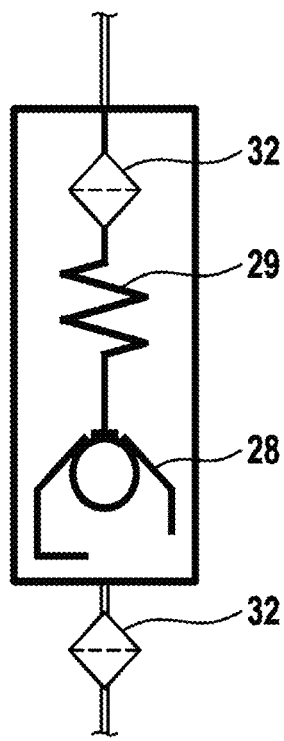
Figure 2C:
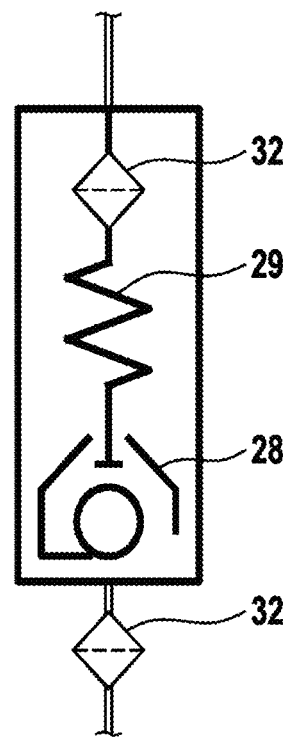

A non-return valve 28 according to the present invention, which has a valve opening spring 29, connects one of the two brake circuits of brake master cylinder 22 to brake fluid reservoir 10. In the exemplary embodiment, the other brake circuit is directly connected to brake fluid reservoir 10. FIGS. 2A through 2C show three different switch positions of non-return valve 28. A flow through non-return-valve 28 in a flow direction from brake fluid reservoir 10 in the direction of brake master cylinder 22 is possible. In an opposite closing direction, valve opening spring 29 keeps non-return valve 28 open until a specified counterpressure is reached. The counterpressure is a pressure differential between brake master cylinder 22 and brake fluid reservoir 10 for a pressureless brake fluid reservoir 10, that is, the pressure in brake master cylinder 22. If the counterpressure is exceeded, the counterpressure closes non-return valve 28 against a spring force of valve opening spring 29 so that no more brake fluid is able to flow out of brake master cylinder 22 into brake fluid reservoir 10.

The counterpressure, which may also be understood as an overpressure in brake master cylinder 22 in relation to pressureless brake fluid reservoir 10 or in relation to a pressure in brake fluid reservoir 10 required in order to close non-return valve 28, is specified by valve opening spring 29 and a geometry and design of non-return valve 28. The counterpressure may be fixed or adjustable.

A filter 32 is connected upstream from non-return valve 28 and a further filter 32 is connected downstream, which means that a filter 32 is situated between brake fluid reservoir 10 and non-return valve 28, and a filter 32 is disposed between non-return valve 28 and brake master cylinder 22. Embodiments without or with only one filter 32 are possible as well, in which case filter 32 should be positioned upstream from non-return valve 28 in a flow direction. Separate filters 32 may be used or a filter or filters 32 is/are integrated into non-return valve 28.

Depicted is a filter which is integrated into non-return valve 28 between brake fluid reservoir 10 and non-return valve 28, and a filter 32 which is separate from non-return valve 28 between non-return valve 28 and brake master cylinder 22.

For an (initial) filling, vehicle power brake system 1 is first evacuated and then filled with brake fluid by brake fluid reservoir 10. During the evacuation process, valve opening spring 29 keeps non-return valve 28 between brake fluid reservoir 10 and brake master cylinder 22 open, as illustrated in FIG. 2A. When replenishing the brake fluid, non-return valve 28 may possibly open wider, as illustrated in FIG. 2C.

If a hydraulic brake pressure is generated by power brake pressure generator 3 in order to check the functional operativeness of power brake pressure generator 3, the generated brake pressure propagates into brake master cylinder 22 if servo valve 11 is opened given an open second isolation valve 23. If the brake pressure in brake master cylinder 22 exceeds the specified counterpressure of non-return valve 28, then non-return valve 28 closes so that no further brake fluid can flow through brake master cylinder 22 into brake fluid reservoir 10. The functional operativeness of power brake pressure generator 3, a possible compressibility of the brake fluid as a result of air inclusions, and the functional operativeness of the valves of vehicle brake system 1 are able to be checked.

To check the functional operativeness of power brake pressure generator 3, servo valve 11 of the brake circuit not provided with a non-return valve 28 according to the present invention remains closed or second isolation valve 23 of this brake circuit is closed so that no brake fluid flows through brake master cylinder 22 into brake fluid reservoir 10 in this brake circuit.

Figure 3:
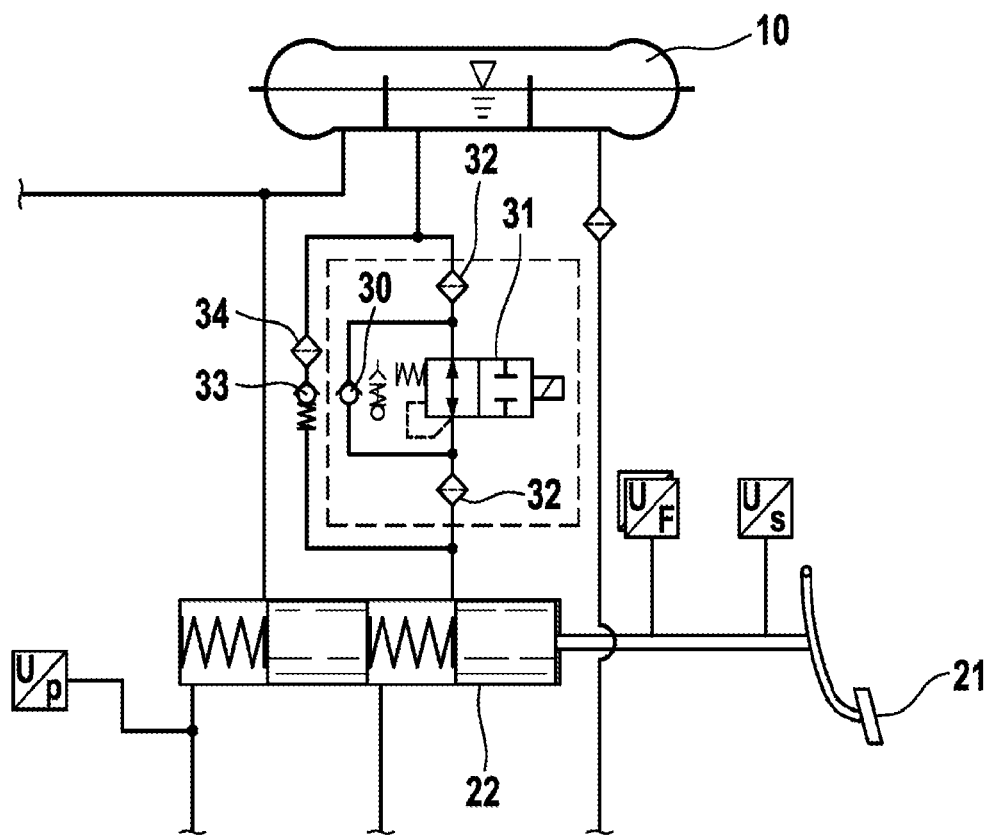
FIG. 3 shows a part of a hydraulic circuit diagram of a modified embodiment of the present invention.

FIG. 3 shows a part of the hydraulic circuit diagram from FIG. 1 in the region of brake fluid reservoir 10 and brake master cylinder 22. Similar to FIG. 1, a non-return valve 30, through which a flow is able to pass in a flow-through direction from brake fluid reservoir 10 to brake master cylinder 22 while a flow in an opposite closing direction is blocked, is also positioned between brake fluid reservoir 10 and brake master cylinder 22. A test valve 31 is hydraulically connected in parallel to non-return valve 30, which is a solenoid valve in the exemplary embodiment, that is, a switchable valve which, when open, connects brake master cylinder 22 to brake fluid reservoir 10 in a brake circuit and which hydraulically separates brake master cylinder 22 from brake fluid reservoir 10 when closed.

Test valve 31 is embodied in such a way that in its closed state, it opens at a specified overpressure in brake master cylinder 22. The overpressure is a higher pressure in brake master cylinder 22 than in brake fluid reservoir 10, which is unpressurized in the exemplary embodiment. The overpressure may be fixed or adjustable. Test valve 31 avoids a higher pressure than the specified overpressure in vehicle brake system 1 when brake master cylinder 22 is not actuated.

The check of the functional operativeness of power brake pressure generator 3 described in connection with FIG. 1 is also possible in FIG. 3 by closing test valve 31, a check pressure being limited to the specified overpressure at which test valve 31 opens if brake master cylinder 22 is not actuated. For example, brake fluid previously suctioned from brake fluid reservoir 10 by power brake pressure generator 3 is able to flow through brake master cylinder 22 and test valve 31 back into brake fluid reservoir 10.

Non-return valve 30 is springless and integrated into test valve 31 and thus requires no additional space.

A further non-return-valve 33, which reduces a flow resistance for brake fluid from brake fluid reservoir 10 into brake master cylinder 22, is hydraulically connected in parallel with non-return valve 30 and test valve 31, which is quite advantageous in a failure of power brake pressure generator 3, when brake fluid is suctioned with the aid of hydraulic pump 12. Because additional non-return valve 33 is not integrated into test valve 31, it may have greater flow cross-sections and a low flow resistance.

In FIG. 3 as well, filters 32 which are integrated into test valve 31, are connected upstream and downstream from non-return valve 30 and test valve 31. More specifically, a filter 32 is situated between brake fluid reservoir 10 on the one side and non-return valve 30 and test valve 31 on the other side, and a filter 32 is disposed between non-return valve 30 and test valve 31 on the one side and brake master cylinder 22 on the other side. A further non-return valve 34 is provided between brake fluid reservoir 10 and additional non-return valve 33. No filter is provided between further non-return valve 33 and brake master cylinder 22 because further non-return valve 33 blocks against a flow-through from brake master cylinder 22 in the direction of brake fluid reservoir 10, which means that no brake fluid that would have to be filtered flows out of brake master cylinder 22 into further non-return valve 33. A flow resistance against a flow through non-return valve 33 from brake fluid reservoir 10 into brake master cylinder 22 is lower when only one filter 33 is used rather than two filters.

In all other respects, vehicle brake systems 1 from FIGS. 1 and 3 agree and function in the same manner so that reference can be made to FIG. 1 for a full description of the circuit diagram from FIG. 3 and to the explanations of FIG. 1 for a full description of FIG. 3.

In the described and illustrated embodiments of the present invention, servo valves 11, first isolation valves 12, inlet valves 16, outlet valves 17, suction valves 20, second isolation valves 23, simulator valve 25, and test valve 31 are 2/2-way solenoid valves, and first isolation valves 12, inlet valves 16, second isolation valves 23 and test valve 31 are open in their currentless basic positions, and servo valves 11, outlet valves 17, suction valves 20, and simulator valve 25 are closed in their currentless basic positions. Other embodiments and/or switch positions of the valves are not excluded. For example, a combination of inlet valves 14 and outlet valves 15 to form 3/2-way solenoid valves (not shown) is possible as well.

What is claimed is:

1. A non-return valve for a hydraulic vehicle power brake system configured to be positioned between a brake fluid reservoir and a brake master cylinder and allow for a flow in a flow-through direction, the non-return valve having a valve opening spring, which keeps the non-return valve open until a specified counterpressure has been reached in a closing direction counter to the flow-through direction, so that the non-return valve closes only once the specified counterpressure in the closing direction has been exceeded.

2. A hydraulic vehicle power brake system, comprising:
a brake master cylinder operable by muscular energy;
a power brake pressure generator; and
a brake fluid reservoir, wherein the brake master cylinder is connected to the brake fluid reservoir by a non-return valve, which is configured to allow for a flow in a flow-through direction from the brake fluid reservoir to the brake master cylinder and which has a valve opening spring which keeps the non-return valve open until a specified counterpressure is reached in a closing direction counter to the flow-through direction, so that the non-return valve closes only once the specified counterpressure in the closing direction has been exceeded.

3. The hydraulic externally-powered vehicle brake system as recited in claim 2, wherein a filter is connected upstream and/or downstream from the non-return valve.

4. The hydraulic vehicle power brake system in claim 2, further comprising:
a hydraulic pump drivable by external power, by which the vehicle brake system is operable in the event of a fault or failure of the power brake pressure generator.

5. A hydraulic externally-powered vehicle brake system, comprising:
a brake master cylinder operable by muscular energy;
a power brake pressure generator; and
a brake fluid reservoir;
a test valve; and
a first non-return valve that is hydraulically parallel to the test valve;
wherein:
the brake master cylinder is connected to the brake fluid reservoir by way of the test valve and the first non-return valve;
the first non-return valve is configured to allow for a flow in a flow-through direction from the brake fluid reservoir to the brake master cylinder and block against a flow-through in an opposite closing direction;
the test valve is switchable into a first switch position and into a second switch position;
when the test valve is in the first switch position, flow can occur through the test valve from the brake fluid reservoir to the brake master cylinder and also from the brake master cylinder to the brake fluid reservoir; and
when the test valve is in the second switch position, (I) flow from the brake fluid reservoir to the brake master cylinder is blocked and (I) flow from the brake master cylinder to the brake fluid reservoir (i) is blocked as long as a specified counterpressure is not reached and (ii) can occur when there is at least the specified counterpressure.

6. The hydraulic vehicle power brake system as recited in claim 5, wherein a filter is connected upstream and/or downstream from the test valve and/or the first non-return valve.

7. The hydraulic vehicle power brake system in claim 5, further comprising:
a hydraulic pump drivable by external power, by which the vehicle brake system is operable in the event of a fault or failure of the power brake pressure generator.

8. The hydraulic vehicle power brake system as recited in claim 5, further comprising:
a first filter arranged between the test valve and the brake fluid reservoir; and
a second filter arranged between the test valve and the brake master cylinder, wherein no filter is arranged between the first non-return valve and the brake master cylinder.

9. The hydraulic vehicle power brake system as recited in claim 5, further comprising:
a second non-return valve that is hydraulically parallel to the first non-return valve and to the test valve.

10. The hydraulic vehicle power brake system as recited in claim 9, further comprising:
at least one first filter arranged between (I) both the test valve and the second non-return valve and (II) the brake fluid reservoir; and
at least one second filter arranged (I) between both the test valve and the second non-return valve and (II) the brake master cylinder, wherein no filter is arranged between the first non-return valve and the brake master cylinder.

11. The hydraulic vehicle power brake system as recited in claim 10, wherein the at least one first filter is arranged between the first non-return valve and the brake fluid reservoir.

12. The hydraulic vehicle power brake system as recited in claim 11, wherein the at least one first filter includes two filters, one being arranged between (I) the brake fluid reservoir and (II) both the test valve and the second non-return valve, and another being arranged between (I) the brake fluid reservoir and (II) the first non-return valve.

13. The hydraulic vehicle power brake system as recited in claim 5, wherein the specified counterpressure is a pressure in the brake master cylinder that is higher by a specified amount than a pressure in the brake fluid reservoir.

* * * * *